(12) United States Patent
Gössling et al.

(10) Patent No.: US 10,498,133 B2
(45) Date of Patent: Dec. 3, 2019

(54) BRUSHLESS DC MOTOR

(75) Inventors: Axel Gössling, Alzenau (DE); Mirko Kress, Goldbach (DE); Mauro Ras, Bibiana (IT); Volker Steigerwald, Schöllkrippen (DE)

(73) Assignee: MAGNA POWERTRAIN BAD HOMBURG GMBH, Bad Homubrg (DE)

( * ) Notice: Subject to any disclaimer, the term of this patent is extended or adjusted under 35 U.S.C. 154(b) by 682 days.

(21) Appl. No.: 13/366,614

(22) Filed: Feb. 6, 2012

(65) Prior Publication Data

US 2012/0200245 A1 Aug. 9, 2012

(51) Int. Cl.
*H02H 7/085* (2006.01)
*H02H 7/08* (2006.01)

(52) U.S. Cl.
CPC .................................. *H02H 7/0838* (2013.01)

(58) Field of Classification Search
USPC .......... 318/778, 432, 473, 471, 472, 400.22; 361/94, 78, 7, 106, 13, 187, 23, 42, 58, 361/93.8, 8, 103, 87; 363/98, 94
See application file for complete search history.

(56) References Cited

U.S. PATENT DOCUMENTS

| | | | |
|---|---|---|---|
| 3,633,084 A | | 1/1972 | Rakes |
| 4,516,182 A | * | 5/1985 | Franklin ........................ 361/13 |
| 5,285,143 A | | 2/1994 | Bahr et al. |
| 5,440,441 A | * | 8/1995 | Ahuja ............................. 361/62 |
| 5,592,353 A | * | 1/1997 | Shinohara et al. ............. 361/63 |
| 5,666,254 A | * | 9/1997 | Thomas et al. ................... 361/8 |
| 5,831,803 A | * | 11/1998 | Wynn et al. ..................... 361/7 |
| 6,392,376 B1 | * | 5/2002 | Kobayashi et al. .......... 318/471 |
| 6,804,159 B2 | * | 10/2004 | Kamiya et al. ............. 365/225.7 |
| 6,870,720 B2 | * | 3/2005 | Iwata et al. ..................... 361/58 |
| 2004/0008457 A1 | * | 1/2004 | Iimura et al. ................... 361/18 |
| 2012/0200245 A1 | * | 8/2012 | Gossling et al. ........ 318/400.22 |

FOREIGN PATENT DOCUMENTS

| | | |
|---|---|---|
| DE | 512497 C | 11/1930 |
| DE | 4213371 A1 | 10/1993 |
| EP | 0088277 A2 | 9/1983 |
| EP | 0831579 A1 | 3/1998 |
| JP | 10271603 A * | 10/1998 |
| JP | 1291628 A | 5/2012 |
| WO | 00/42698 A1 | 7/2000 |

* cited by examiner

*Primary Examiner* — Jorge L Carrasquillo
(74) *Attorney, Agent, or Firm* — Jordan IP Law, LLC; Todd A. Vaughn

(57) ABSTRACT

A brushless DC motor having a plurality of electrical windings and a control circuit operatively connected thereto. The control circuit includes a plurality of switches configured for a time-dependent application of an electrical voltage from an external voltage supply to the windings. A measuring device is also provided for generating an electrical signal depending on the current flow $I_B$ from the external voltage supply through the control circuit. An overcurrent fuse is further provided for protecting the control circuit and the windings. In order to achieve particularly high integration of the control circuit, the invention proposes supplying a voltage drop across the overcurrent fuse to the measuring device as an input value.

15 Claims, 1 Drawing Sheet

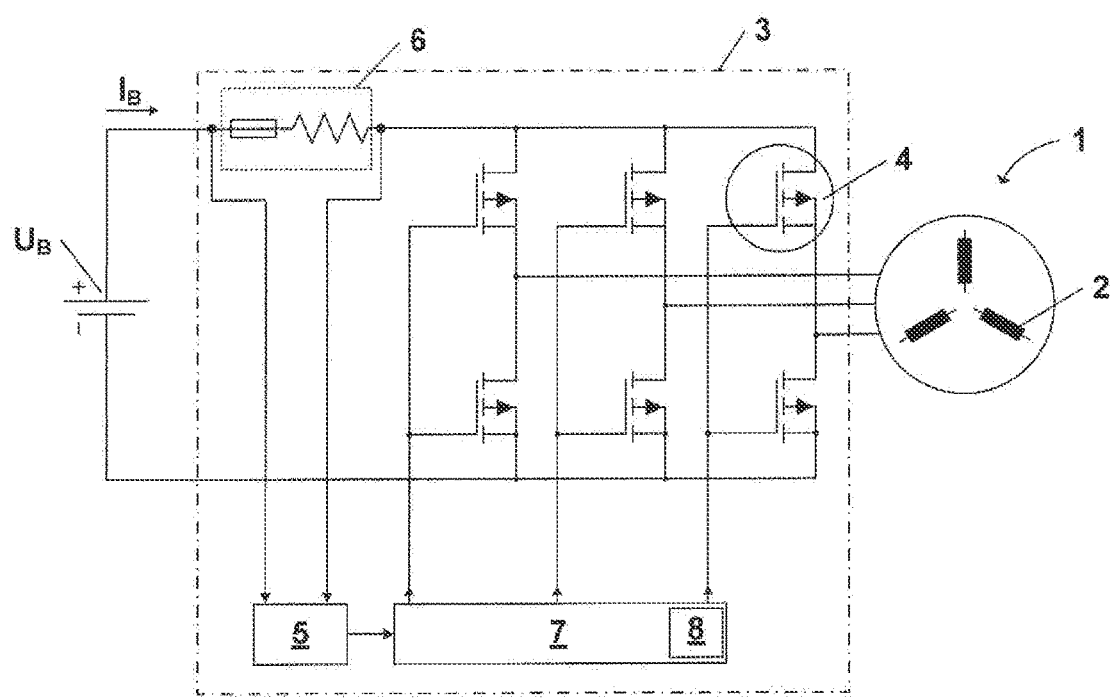

10,498,133 B2

BRUSHLESS DC MOTOR

CROSS-REFERENCE TO RELATED APPLICATIONS

The present application claims priority under 35 U.S.C. § 119, to German Patent Application No. 10 2011 010 567.0 (filed on Feb. 7, 2011), which is hereby incorporated by reference in its entirety.

FIELD OF THE INVENTION

The invention relates to a brushless DC motor, and in particular, a brushless DC motor with a control circuit.

BACKGROUND OF THE INVENTION

A conventional brushless DC motor with a control circuit is disclosed in document EP 0 088 277 A2. The document discloses in particular the detection of the current consumption of a three-phase bridge driver by shunts. The detected value is used for controlling the motor.

A conventional protective circuit for a bridge driver in a polyphase synchronous motor is disclosed in document DE 10 2005 014 167 A1 This protective circuit is aimed at identifying a state of damage in a switching means and in particular in a MOSFET in order to be able to take measures to counteract subsequent damage, if appropriate.

Furthermore, document DE 10 2005 058 221 B3 discloses an overcurrent fuse for various purposes. A fuseable electrically conductive material, which heats up as an electrical current flows owing to the electrical resistance of said material, is arranged between two holders. The cross section of the current flow is dimensioned such that, when a fixed value is exceeded, the fusing temperature is exceeded. The fused material then flows out of the conduction path, as a result of which the current flow is interrupted.

Yet further, alternative embodiments for overcurrent fuses are disclosed in documents DE 10 2009 036 578 B3 and DE 10 2005 040 308 A1.

SUMMARY OF THE INVENTION

In accordance with embodiments, a brushless DC motor is provided with a control circuit which integrates an overcurrent protection means in a particularly expedient manner.

In accordance with embodiments, a brushless DC motor is provided having a plurality of electrical windings and a control circuit operatively connected thereto, and includes a device for time-dependent application of an electrical voltage from an external voltage supply ($U_B$) to the windings, a measuring device configured to generate an electrical signal depending on the current flow ($I_B$) from the external voltage supply ($U_B$) through the control circuit, and an overcurrent fuse configured to protect the control circuit and the windings, whereby a voltage drop across the overcurrent fuse can be supplied to the measuring device as an input value.

Advantageous configurations and developments of the present invention are defined in the dependent claims.

BRIEF DESCRIPTION OF THE DRAWINGS

The invention is described in more detail in the enclosed figures and drawings, which present an implementation example. The drawings demonstrate:

FIG. 1 illustrates a schematic circuit diagram of a brushless DC motor with a control circuit in accordance with embodiments of the present invention.

DETAILED DESCRIPTION OF EMBODIMENTS

As illustrated in FIG. 1, a plurality of electrical windings 2 are applied in a brushless DC motor 1. The windings 2 are part of a so-called stator, which has a design known per se and is arranged adjacent to a permanent magnet rotor. Both the stator and the rotor have been omitted in the drawing for reasons of clarity.

A control circuit 3 is provided for connecting the voltage from an external voltage source $U_B$ to the windings 2 in a time-dependent fashion and with alternating polarity. For this purpose, the control circuit 3 includes a plurality of switches 4, which, in a manner known per se, are in the form of MOSFETs and are connected to one another as a three-phase bridge driver. The three-phase bridge driver for its part is driven by control logic 7. Reference is made to the relevant technical literature as regards the details of the MOSFETs and driving thereof by the control logic 7.

In addition, the control circuit 3 also includes an overcurrent fuse 6 which is arranged in the feedline of the supply voltage. The overcurrent fuse 6, in the event of a predetermined current value being exceeded, is configured to interrupt the supply of supply voltage, and therefore, the current flow through the control circuit 3. The overcurrent fuse 6 can be in the form of an irreversible fusable link, a bimetallic-strip or magnet fuse or have another known design. The overcurrent fuse 6 is configured to prevent the windings 2 from overheating and catching tire, and also to prevent subsequent destruction of the switches 4 in the event of a short circuit in one of the switches 4 of the three-phase bridge driver.

Furthermore, the control circuit 3 includes a measuring device 5 configured to generate an electrical signal depending on the current flow $I_B$ from the external voltage supply $U_B$ through the control circuit 3. A value for the instantaneous power consumption of the brushless DC motor 1 is derived in a manner known per se from this electrical signal and possibly from a comparable signal depending on the applied supply voltage $U_B$. The value for the instantaneous power consumption, in turn, influences the time-dependent driving of the windings 2. This measure has particularly considerable significance when the rotor position of the motor is not available for driving the windings 7.

A voltage drop along the overcurrent fuse 6 can be supplied to the measuring device 5 by virtue of suitable circuitry. Correspondingly, the schematic illustration shows the overcurrent fuse 6 in terms of its equivalent circuit diagram including an ideal fuse component and a real internal impedance. Since the real internal impedance of the overcurrent fuse 6 is a virtually resistive impedance, the voltage drop across said internal impedance is approximately proportional to the current $I_B$ to be detected apart from the effects of temperature. Therefore, the power consumption of the control circuit 3 from the voltage source can be determined approximately from the measured current and the value for the supplied voltage.

Conventional embodiments of overcurrent fuses with tolerances for their impedance value are not available on the market, however. Therefore, in practice additional measures are required for managing the influences of variations in production as regards the overcurrent fuses 6 on the quality of the motor operation. In principle, although it is possible to measure the impedance value of the overcurrent fuse 6 individually in series production and to adjust this by way of processing the overcurrent fuse or to compensate for this by changing the rest of the control circuit 2, for example, by providing a compensating resistor, a significant advantage of the proposed integration would thus be lost.

It is, therefore, preferred to determine the impedance of the overcurrent fuse 6 which is to be installed in each case and to provide data corresponding to the specific impedance value in a data storage 8 such as, e.g., a non-volatile program memory) in the control logic 7 (such as, e.g., a computation device) of the control circuit 2 in the case of series production. Accordingly, it is possible for the data to be read electrically during operation of the brushless DC motor 1 and supplied to a computation device 7. This computation device 7 then provides the desired correction. Such a computation device 7 does not require any additional components in the embodiments which are typical at present because the control logic 7 typically includes a microprocessor and a non-volatile program memory 8 for sequential control of the microprocessor. In addition, in the majority of cases the program code required for operation is written individually to the non-volatile program memory 8. To this extent, there is the possibility of the data relating to the measured impedance of the overcurrent fuse 6 likewise being stored as a parameter for the program to be implemented when the non-volatile program memory 8 is written to in this way, an electrical signal can be generated within the control circuit 3 depending on the current flow $I_B$, with this electrical signal still only deviating from the theoretical precise value within predetermined limits.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A motor comprising:
    a plurality of electrical windings to receive a voltage from an external voltage supply;
    a control circuit to connect the voltage from the external voltage supply to the electrical windings in a time-dependent fashion and with alternating polarity, the control circuit including;
        a plurality of switches configured to apply the voltage from the external voltage supply, in a time-dependent manner, to the electrical windings;
        an overcurrent fuse to protect the control circuit and the electrical windings;
        a measuring device to measure a voltage across the overcurrent fuse and then generate an electrical signal; and
        control logic to receive the electrical signal from the measuring device, store electrically readable data relating to the voltage across the overcurrent fuse, and drive, in a time-dependent manner, the electrical windings using a derived value from the electrical signal and a comparable signal relating to the voltage supplied by the external voltage supply, for an instantaneous power consumption of the motor.

2. The motor of claim 1, wherein the data read from the data storage devices encode a discrepancy between electrical characteristics of the overcurrent fuse and a predetermined value.

3. The motor of claim 2, wherein the electrical characteristics comprise electrical resistance.

4. The motor of claim 1, wherein the data read from the control logic encodes a discrepancy between the electrical characteristics of the overcurrent fuse and a predetermined set of values.

5. The motor of claim 4, wherein the electrical characteristics comprise electrical resistance.

6. A motor comprising:
    windings to receive a voltage from an external voltage supply;
    a control circuit to connect the voltage from the external voltage supply to the windings in a time-dependent fashion and with alternating polarity, the control circuit including an overcurrent fuse provided in the feedline of the voltage, a measuring device to generate an electrical signal depending on a current flow through the control circuit from the external voltage supply, switches to apply the voltage in a time-dependent manner to the windings, a measuring device to generate an electrical signal depending on the current flow form the external voltage supply, and control logic to receive the electrical signal from the measuring device, store electrically readable data relating to the voltage across the overcurrent fuse, and drive, in a time-dependent manner, the electrical windings using a derived value from the electrical signal and a comparable signal relating to the voltage supplied by the external voltage supply, for an instantaneous power consumption of the motor,
    wherein the overcurrent fuse if to interrupt the supply of voltage in the event of a predetermined current value being exceeded.

7. The motor of claim 6, wherein the data read from the control logic encodes a discrepancy between electrical characteristics of the overcurrent fuse and the predetermined current value.

8. The motor of claim 7, wherein the electrical characteristics comprise electrical resistance.

9. The motor of claim 6, wherein the data read from the control logic encodes a discrepancy between the electrical characteristics of the overcurrent fuse and a predetermined set of values.

10. The motor of claim 9, wherein the electrical characteristics comprise electrical resistance.

11. A motor comprising:
    windings;
    a control circuit to operatively connect a voltage from an external voltage supply to the windings in a time-dependent fashion and with alternating polarity, the control circuit including:
        an overcurrent fuse provided in a feedline of the voltage received by the windings from the external voltage supply;
        a measuring device to generate an electrical signal relating to a current flow through the control circuit;
        switches to apply the voltage to the windings in a time-dependent manner; and
        control logic to receive the electrical signal from the measuring device, store electrically readable data relating to the voltage across the overcurrent fuse, and drive, in a time-dependent manner, the electrical windings using a derived value from the electrical signal and a comparable signal relating to the voltage supplied by the external voltage supply, for an instantaneous power consumption of the motor.

12. The motor of claim 11, wherein the data read from the control logic encodes a discrepancy between the electrical characteristics of the overcurrent fuse and a predetermined value.

13. The motor of claim 12, wherein the electrical characteristics comprise electrical resistance.

14. The motor of claim 11, wherein the data read from the control logic encodes a discrepancy between the electrical characteristics of the overcurrent fuse and a predetermined set of values.

15. The motor of claim 14, wherein the electrical characteristics comprise electrical resistance.

* * * * *